US007755630B2

(12) United States Patent
Woo

(10) Patent No.: US 7,755,630 B2
(45) Date of Patent: Jul. 13, 2010

(54) METHOD, MEDIUM, AND APPARATUS CONTROLLING GRAPHICS ACCELERATOR VOLTAGE

(75) Inventor: Sangoak Woo, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 11/497,294

(22) Filed: Aug. 2, 2006

(65) Prior Publication Data

US 2007/0030274 A1 Feb. 8, 2007

(30) Foreign Application Priority Data

Aug. 4, 2005 (KR) ...................... 10-2005-0071393

(51) Int. Cl.
*G06F 15/00* (2006.01)
*G06T 1/00* (2006.01)

(52) U.S. Cl. ...................................................... 345/501

(58) Field of Classification Search .................. 345/501
See application file for complete search history.

(56) References Cited

U.S. PATENT DOCUMENTS

2003/0065960 A1* 4/2003 Rusu et al. .................. 713/300
2003/0118112 A1* 6/2003 Son et al. ............... 375/240.25
2003/0233592 A1* 12/2003 Lin et al. ..................... 713/320
2005/0076253 A1* 4/2005 Lu ............................. 713/320

OTHER PUBLICATIONS

Fernando, R., GPU Gems: Programming Techniques, Tips and Tricks for Real-Time Graphics, 2004, Pearson Higher Education. Ch. 28.*
Mochocki, B., Lahiri, K., and Cadambi, S., Power analysis of mobile 3D graphics. In Proceedings of the Conference on Design, Automation and Test in Europe: Proceedings (Munich, Germany, Mar. 6-10, 2006)., pp. 502-507.*

* cited by examiner

*Primary Examiner*—Ryan R Yang
(74) *Attorney, Agent, or Firm*—Staas & Halsey LLP

(57) ABSTRACT

A method, medium, and apparatus controlling a 3D graphics accelerator. The apparatus may include a voltage controller to determine a voltage and frequency supplied to the 3D graphics accelerator by using the 3D graphics data, so that a frames per second (FPS) of the image does not exceed a predetermined threshold, and a voltage supplier to supply a voltage and the frequency to the 3D graphics accelerator. The voltage and frequency supplied to the 3D graphics accelerator may be adjusted by a DVS technique so that the FPS of the generated image does not exceed the predetermined threshold. Accordingly, it is possible to control power consumption of the 3D graphics accelerator while maintaining performance at or above a given level. In particular, it is possible to very efficiently process a small amount of 3D graphics data with low power in a portable device.

28 Claims, 3 Drawing Sheets

METHOD, MEDIUM, AND APPARATUS CONTROLLING GRAPHICS ACCELERATOR VOLTAGE

CROSS-REFERENCE TO RELATED APPLICATIONS

This application claims the benefit of Korean Patent Application No. 10-2005-0071393, filed on Aug. 4, 2005, in the Korean Intellectual Property Office, the disclosure of which is incorporated herein in its entirety by reference.

BACKGROUND OF THE INVENTION

1. Field of the Invention

Embodiments of the present invention relate to 3D graphics accelerators, and more particularly, to a method, medium, and apparatus controlling 3D graphics accelerator voltage in order to control power consumption.

2. Description of the Related Art

In the image display field, 3D graphics is a technique for representing an image of a three dimensional object using three components, such as height, width and length, and displaying the image on a two dimensional screen. Typically, a 3D graphics accelerator receives information of a geometric shape as described by a shape modeler and applies components, such as visual point and light, to the geometric shape to generate an image.

A series of processes performed by the 3D graphics accelerator form a graphics pipeline. When the pipeline includes a slow process, the speed of the pipeline is reduced. Accordingly, the 3D graphics accelerator generally must perform each process in a given time, and thus receives power from a power supply to generate an image within the given time.

Recently, portable devices, such as portable phones, have been developed to display images using 3D graphics accelerators. Unlike desktop computers, portable devices need to operate at low power due to the limited capacity of their portable batteries. In addition, it is also necessary to maintain the performance of the portable device at or above a given level while reducing the power consumption of the portable device.

SUMMARY OF THE INVENTION

Accordingly, an embodiment of the present invention provides a method, medium, and apparatus controlling 3D graphics accelerator voltage to control the power consumption while maintaining the performance of the 3D graphics accelerator at or above a given level.

Additional aspects and/or advantages of the invention will be set forth in part in the description which follows and, in part, will be apparent from the description, or may be learned by practice of the invention.

To achieve the above and/or other aspects and advantages, embodiments of the present invention include an apparatus for controlling a graphics accelerator, the apparatus including a voltage controller to determine a voltage and a frequency to be implemented with a graphics accelerator so that a frames per second (FPS) of an image to be generated by the graphics accelerator does not exceed a predetermined threshold, and a voltage supplier to supply the determined voltage and frequency to the graphics accelerator.

The voltage controller may determine the voltage and the frequency using a dynamic voltage scaling (DVS) technique.

In addition, the voltage controller may reduce the voltage and/or the frequency when the FPS of the image exceeds the predetermined threshold.

Further, the voltage controller may include a characteristic value extractor to extract a characteristic value from graphics data to be provided to the graphics accelerator, a memory to store a relationship between the characteristic value and the voltage and the frequency supplied to the graphics accelerator, and a voltage/frequency detector to determine the voltage and the frequency corresponding to the extracted characteristic value based on the stored relationship.

Here, the memory may store a plurality of pairs of voltages and frequencies for supply to the graphics accelerator such that each of the plurality of pairs is matched in the memory with corresponding characteristic values.

When the extracted characteristic value exceeds a corresponding characteristic value stored in the memory, the voltage controller may control the voltage and frequency to change to corresponding maximum values of voltages and frequencies stored in the memory.

The memory may further store a relational expression between the characteristic value and the voltage and the frequency supplied to the graphics accelerator.

In addition, the characteristic value may include at least one of a number of vertexes, a sum of texture sizes, a number of lights, a texture filtering scheme, a number of commands to be used for one vertex in a vertex shader, and a number of commands to be used for one pixel in a pixel shader.

Here, the voltage controller may extract at least one of the number of vertexes and the number of lights from the graphics data to determine a voltage and frequency supplied to a transform and lightning (TnL) unit included in the graphics accelerator, and extract at least one of the number of vertexes, the sum of texture sizes, and the texture filtering scheme to determine a voltage and frequency supplied to a rasterizer included in the graphics accelerator.

Further, the voltage controller may extract at least one of the number of vertexes and the number of commands to be used for one vertex in a vertex shader from the graphics data to determine a voltage and frequency supplied to the vertex shader included in the graphics accelerator, extract at least one of the number of vertexes, the sum of texture sizes, and the number of commands to be used for the one pixel in the pixel shader to determine a voltage and frequency supplied to the pixel shader included in the graphics accelerator, and extract at least one of the number of vertexes, the sum of texture sizes, and the texture filtering scheme to determine a voltage and frequency supplied to a rasterizer included in the graphics accelerator.

The apparatus may further include an FPS measurer to measure an FPS of the image information, as generated by the graphics accelerator, wherein the voltage/frequency detector reduces the voltage and/or the frequency when the measured FPS exceeds the predetermined threshold.

In addition, the apparatus may include an FPS measurer to measure an FPS of the image, as generated by the graphics accelerator, wherein the voltage controller determines a predetermined voltage and a predetermined frequency, among voltages and frequencies that can be supplied to the graphics accelerator, to be the voltage and the frequency based on the measured FPS.

Still further, the apparatus may include the graphics accelerator, wherein the graphics accelerator is a 3D graphics accelerator.

Here, the voltage controller may determine the voltage and the frequency using a DVS technique.

Further, the voltage controller may include a characteristic value extractor to extract a characteristic value from graphics data to be provided to the graphics accelerator, a memory to store a relationship between the characteristic value and the voltage and the frequency supplied to the graphics accelerator, and a voltage/frequency detector to determine the voltage and the frequency corresponding to the extracted characteristic value based on the stored relationship.

The memory may store a plurality of pairs of voltages and frequencies for supply to the graphics accelerator such that each of the plurality of pairs is matched in the memory with corresponding characteristic values.

In addition, the characteristic value may include at least one of a number of vertexes, a sum of texture sizes, a number of lights, a texture filtering scheme, a number of commands to be used for one vertex in a vertex shader, and a number of commands to be used for one pixel in a pixel shader.

The graphics accelerator may further include a TnL unit and a rasterizer, and the voltage controller may extract at least one of the number of vertexes and the number of lights from the graphics data to determine a voltage and frequency supplied to the TnL unit, and extract at least one of the number of vertexes, the sum of texture sizes, and the texture filtering scheme to determine a voltage and frequency supplied to the rasterizer.

In addition, the graphics accelerator may include the vertex shader, the pixel shader, and a rasterizer, and the voltage controller may extract at least one of the number of vertexes and the number of commands to be used for the one vertex in the vertex shader from the graphics data to determine a voltage and frequency supplied to the vertex shader, extracts at least one of the number of vertexes, the sum of texture sizes, and the number of commands to be used for the one pixel in the pixel shader to determine a voltage and frequency supplied to the pixel shader, and extract at least one of the number of vertexes, the sum of texture sizes, and the texture filtering scheme to determine a voltage and frequency supplied to the rasterizer.

To achieve the above and/or other aspects and advantages, embodiments of the present invention include a method of controlling a graphics accelerator, the method including determining a voltage and a frequency to be supplied to the graphics accelerator by using graphics data to be supplied to the graphics accelerator, so that a frames per second (FPS) of an image to be generated by the graphics accelerator does not exceed a predetermined threshold, and supplying the determined voltage and frequency to the graphics accelerator.

The method may further include supplying the graphics data to the graphics accelerator, with the graphics accelerator being a 3D graphics accelerator and the graphics data being 3D graphics data.

The voltage and the frequency may be determined using a DVS technique.

The voltage and/or the frequency may further be reduced during the determination thereof when the FPS of the image exceeds the predetermined threshold.

In addition, the determining of the voltage and the frequency may include extracting a characteristic value from the graphics data, and reading a voltage and frequency corresponding to the extracted characteristic value from the memory, storing relationships between characteristic values and voltages and frequencies to be supplied to the graphics accelerator, and determining the read voltage and the read frequency to be the determined voltage and the frequency supplied to the graphics accelerator.

Here, the characteristic value may include at least one of a number of vertexes, a sum of texture sizes, a number of lights, a texture filtering scheme, a number of commands to be used for one vertex in a vertex shader, and a number of commands to be used for one pixel in a pixel shader.

Further, the determining of the voltage and the frequency may include extracting at least one of the number of vertexes and the number of lights from the graphics data to determine a voltage and frequency supplied to a TnL unit included in the graphics accelerator; and extracting at least one of the number of vertexes, the sum of texture sizes, and the texture filtering scheme to determine a voltage and frequency supplied to a rasterizer included in the graphics accelerator.

Still further, the determining of the voltage and the frequency may include extracting at least one of the number of vertexes and the number of commands to be used for the one vertex in the vertex shader from the graphics data to determine a voltage and frequency supplied to the vertex shader included in the graphics accelerator, extracting at least one of the number of vertexes, the sum of texture sizes, and the number of commands to be used for the one pixel in the pixel shader to determine a voltage and frequency supplied to the pixel shader included in the graphics accelerator, and extracting at least one of the number of vertexes, the sum of texture sizes, and the texture filtering scheme to determine a voltage and frequency supplied to a rasterizer included in the graphics accelerator.

In the determining of the voltage and the frequency, a predetermined voltage and a predetermined frequency, among predetermined voltages and frequencies that can be supplied to the graphics accelerator, may be determined to be the voltage and the frequency.

The method may further include measuring an FPS of the image, as generated by the graphics accelerator, and reducing the voltage and/or the frequency when the measured FPS exceeds the predetermined threshold.

To achieve the above and/or other aspects and advantages, embodiments of the present invention include at least one medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
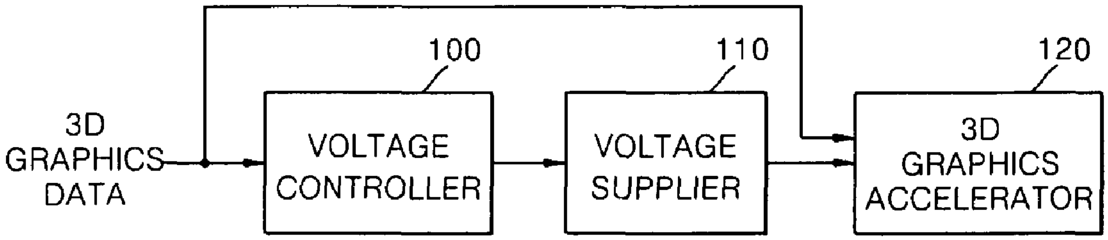
FIG. 1 illustrates a voltage control apparatus, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a voltage control apparatus, according to an embodiment of the present invention.

Referring to FIG. 1, and as an example, the voltage control apparatus may include a voltage controller 100, a voltage supplier 110, and a 3D graphics accelerator 120, for example.

According to an embodiment, the voltage controller 100 may receive and analyze 3D graphics data to determine a voltage and frequency for the 3D graphics accelerator 120, so that the number of frames per second (FPS) of an image generated from the 3D graphics accelerator 120 may not exceed a predetermined threshold. For example, when a 3D graphics player needs to generate an image with 30 frames per second, the voltage controller 100 may determine the voltage and frequency so that the FPS of the generated image may not exceed 30 frames. That is, when the FPS of the generated image exceeds 30 frames, the voltage controller 100 may preferably reduce the voltage and frequency, for example.

The voltage and frequency may be determined using a dynamic voltage scaling (DVS) technique, for example. Since the power (P) consumed by the 3D graphics accelerator 120 is proportional to the square of the supply voltage V, the consumed power can be reduced by a reduction in the supply voltage V. However, the propagation delay of the 3D graphics accelerator increases as the supply voltage decreases. Accordingly, the clock frequency must be reduced in order to stably operate the 3D graphics accelerator 120. In addition, the clock frequency must have a higher frequency than is necessary for the 3D graphics accelerator 120 to complete all necessary operations within a given time. The given time is determined depending on the FPS of the 3D graphics accelerator 120.

As described above, using the DVS technique, the clock frequency may be adjusted to a lowest frequency satisfying the given time in consideration of each operating state of the 3D graphics accelerator 120, and the supply voltage may be reduced with the reduction of the clock frequency, thereby reducing the power consumption of the 3D graphics accelerator 120.

Figure 2A:
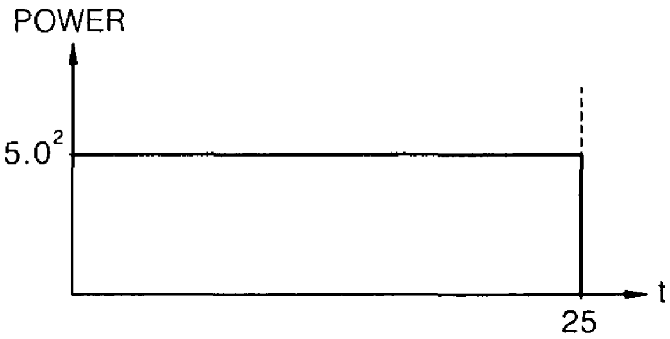
FIGS. 2A through 2C illustrate a voltage control method using a DVS technique, according to an embodiment of the present invention.
Figure 2B:
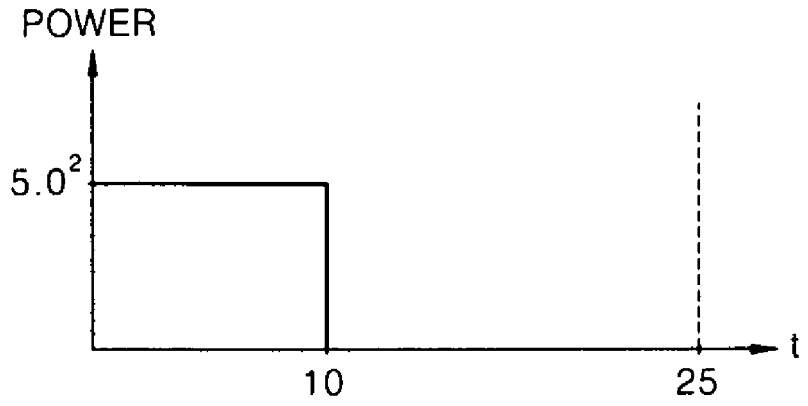
Figure 2C:
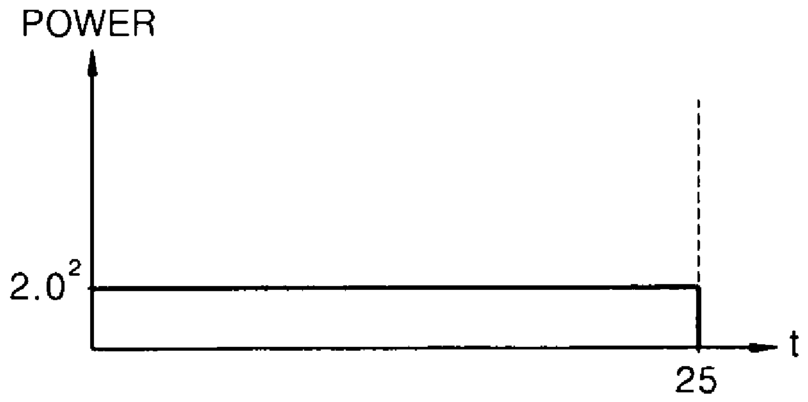

FIGS. 2A through 2C illustrate a voltage control method using such a DVS technique, according to an embodiment of the present invention. Referring to FIG. 2A, when a 50 MHz/5V combination is implemented with the 3D graphics accelerator 120 for 25 seconds, the power consumption of the 3D graphics accelerator 120 is 31.25 J. Referring to FIG. 2B, when 5×108 cycles are required to complete an operation of the 3D graphics accelerator 120 and a 50 MHz/5V combination is implemented with the 3D graphics accelerator 120, the operation of the 3D graphics accelerator 120 is completed within 10 seconds, followed by an idle time of 15 seconds, resulting in a power consumption of 12.5 J. Accordingly, as shown in FIG. 2C, when a 20 MHz/2V combination is implemented with the 3D graphics accelerator 120, the 3D graphics accelerator 120 has no/less idle time, resulting in a greatly-reduced power consumption of 2 J.

Thus, according to an embodiment of the present invention, the voltage supplier 110 may supply power to the 3D graphics accelerator 120 according to the determined voltage and frequency.

Further, according to an embodiment of the present invention, the voltage controller 100 may choose from a predetermined voltage and/or a predetermined frequency that can be implemented with the 3D graphics accelerator 120. In this case, a maximum voltage and a maximum frequency may be chosen, from among voltages and frequencies that may be implemented by the 3D graphics accelerator 120, as an example of such a predetermined voltage and frequency.

According to another embodiment, the voltage controller 100 may predict the FPS of an image that will be generated by the 3D graphics accelerator 120, and determines the voltage and the frequency to be implemented by the 3D graphics accelerator 120 so that the predicted FPS may not exceed the threshold. In this case, the voltage controller 100 may predict the FPS by analyzing the input 3D graphics data, for example.

Figure 3:
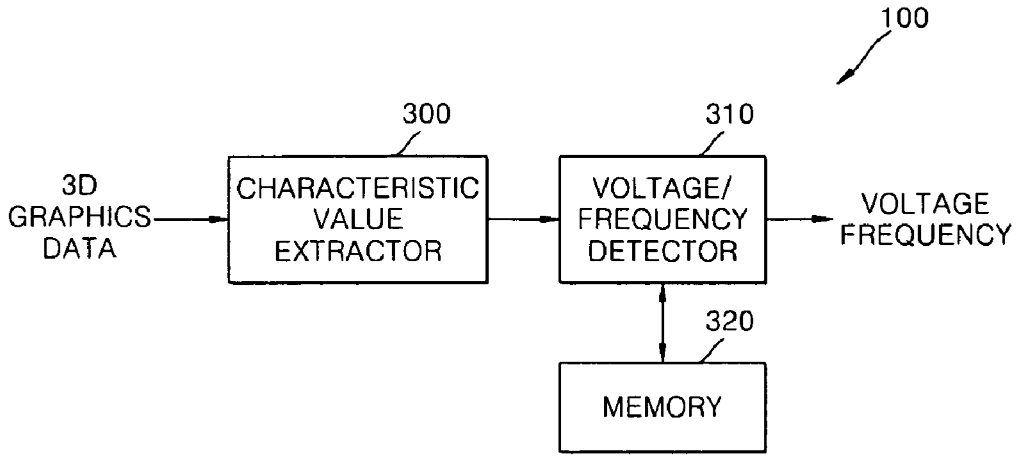
FIG. 3 illustrates a voltage controller, such as that illustrated in FIG. 1, according to an embodiment of the present invention.

FIG. 3 illustrates a voltage controller 100, such as the voltage controller 100 of FIG. 1, according to an embodiment of the present invention, including a characteristic value extractor 300, a voltage/frequency detector 310, and a memory 320, for example.

The characteristic value extractor 300 may extract from received 3D graphics data characteristic values of an image to be generated by the 3D graphics accelerator 120. The characteristic values may include the number of vertexes, the number of textures, the sum of texture sizes, the actual size of an object to be played, the number of lights, a texture filtering scheme, the number of commands to be used for one vertex in a vertex shader, the number of commands to be used for one pixel in a pixel shader, etc., for example.

The memory 320 may store extracted characteristic values and information about a relationship between the voltage and frequency that does not make the FPS of the generated image exceed the predetermined threshold. As an example, the extracted values and a corresponding relationship may be derived beforehand, e.g., through experimentation, and stored in the memory 320, noting that alternative embodiments are equally available.

In one embodiment, the memory 320 may store a table, for example, in which the voltage and frequency that do not make the FPS of the generated image exceed the predetermined threshold are matched to each of the characteristic values.

For example, when the number of vertexes, the number of lights, and the predetermined threshold are respectively M, L, and 30 FPS, the voltage and frequency to be implemented by the 3D graphics accelerator 120 to play the image at a rate of 30 FPS may be experimentally measured. Then, for example, the measured frequency and voltage may be stored in the memory 320 to later be matched to M and L.

The voltage/frequency detector 310 may receive the characteristic values from the characteristic value extractor 300, for example, and read from the memory 320 the appropriate voltage and frequency corresponding to the received characteristic values, as another example.

When the 3D graphics accelerator 120 uses a fixed pipeline, for example, including a transform and lighting (TnL) unit and a rasterizer, the voltage/frequency detector 310 may detect voltages and frequencies to be implemented with the TnL unit and the rasterizer. The TnL unit transforms 3D graphics data into 2D graphics data and performs a light source effect, while the rasterizer fills in the 2D-transformed triangle to generate an image.

Table 1 below illustrates an example of a table, e.g., which may be stored in the memory 320, where the characteristic values are matched to a voltage and frequency to be implemented with the TnL unit.

TABLE 1

| Voltage, Frequency | V1, F1 | V2, F2 | V3, F3 |
|---|---|---|---|
| Characteristic values M, L | M1, L1 | M2, L2<br>M1, L3<br>M3, L1<br>M2, L1<br>M1, L2 | M3, L3<br>M2, L3<br>M3, L2 |

Here, in Table 1, M is the number of vertexes, L is the number of lights, and M1<M2<M3, L1<L2<L3, V1<V2<V3, and F1<F2<F3.

When the characteristic value extractor 300 extracts from the 3D graphics data, for example, and the extracted characteristic values indicate that the number of vertexes and the number of lights are respectively M2 and L3, the voltage/frequency detector 310 may detect V3 and F3 as corresponding to the extracted values M2 and L3 for the voltage and frequency, respectively.

Such a method of detecting, e.g., by the voltage/frequency detector 310, the voltage and frequency corresponding to the received characteristic values by searching the memory 320 with reference to Table 1 will now be described in greater detail.

When the extracted characteristic values indicate that the number of vertexes and the number of lights are respectively m and 1 (M1<m<M2, L2<1<L3) the voltage/frequency detector 310 may detect V3 and F3 corresponding to M2 and L3 as the voltage and frequency, respectively. On the other hand, when m<M1 and 1>L3, the voltage/frequency detector 310 may detect V2 and F2 corresponding to M1 and L3 as the voltage and frequency, respectively.

As another example, Table 2 below illustrates a table, e.g., which may be stored in the memory 320, where the characteristic values are matched to the voltage and frequency to be implemented with the rasterizer.

TABLE 2

| Voltage, Frequency | V1, F1 | V2, F2 | V3, F3 |
|---|---|---|---|
| Characteristic values | M1, S1, T1 | M2, S2, T2 | M3, S3, T3 |
| M, S, T | | M1, S3, T2 | M1, S3, T3 |
| | | M3, S1, T2 | M2, S3, T3 |
| | | M3, S2, T1 | M3, S1, T3 |
| | | M1, S2, T3 | M3, S2, T3 |
| | | M2, S1, T3 | M3, S3, T1 |
| | | M2, S3, T1 | M3, S3, T2 |

In Table 2, S may be the sum of texture sizes included in the 3D graphics data and T may be a value with information about the texture filtering used for the 3D graphics data. For example, T may have one of NONE (no texture filtering being used), BILINEAR, and TRILINEAR. For example, T1, T2 and T3 may be set to NONE, BILINEAR, and TRILINEAR, respectively.

When the 3D graphics accelerator 120 uses a programmable pipeline, for example, including a vertex shader, a pixel shader, and a rasterizer, the voltage/frequency detector 310 may detect voltages and frequencies to be implemented with the vertex shader, the pixel shader, and the rasterizer, for example.

As another example, Table 3 below illustrates a table, e.g., which may be stored in the memory 320, where the characteristic values are matched to a voltage and frequency to be implemented with the vertex shader.

TABLE 3

| Voltage, Frequency | V1, F1 | V2, F2 | V3, F3 |
|---|---|---|---|
| Characteristic values | M1, R1 | M2, R2 | M3, R3 |
| M, L | | M1, R3 | M2, R3 |
| | | M3, R1 | M3, R2 |
| | | M2, R1 | |
| | | M1, R2 | |

In Table 3, R is the number of commands used for one vertex in the vertex shader.

As a further example, Table 4 below illustrates a table, e.g., which may be stored in the memory 320, where the characteristic values are matched to a voltage and frequency to be implemented with the pixel shader.

TABLE 4

| Voltage, Frequency | V1, F1 | V2, F2 | V3, F3 |
|---|---|---|---|
| Characteristic values | M1, S1, P1 | M2, S2, P2 | M3, S3, P3 |
| M, S, P | | M1, S3, P2 | M1, S3, P3 |
| | | M3, S1, P2 | M2, S3, P3 |
| | | M3, S2, P1 | M3, S1, P3 |
| | | M1, S2, P3 | M3, S2, P3 |
| | | M2, S1, P3 | M3, S3, P1 |
| | | M2, S3, P1 | M3, S3, P2 |

In Table 4, P is the number of commands used for one pixel in the pixel shader.

As still another example, Table 5 below illustrates a table, e.g., which may be stored in the memory 320, where the characteristic values are matched to a voltage and frequency to be implemented with the rasterizer.

TABLE 5

| Voltage, Frequency | V1, F1 | V2, F2 | V3, F3 |
|---|---|---|---|
| Characteristic values | M1, S1, T1 | M2, S2, T2 | M3, S3, T3 |
| M, S, T | | M1, S3, T2 | M1, S3, T3 |
| | | M3, S1, T2 | M2, S3, T3 |
| | | M3, S2, T1 | M3, S1, T3 |
| | | M1, S2, T3 | M3, S2, T3 |
| | | M2, S1, T3 | M3, S3, T1 |
| | | M2, S3, T1 | M3, S3, T2 |

According to still another embodiment, a voltage and frequency determined by the voltage controller 100 may be adjusted. In other words, the determined voltage and the determined frequency may be adjusted by using a measured FPS of the image actually generated by the 3D graphics accelerator 120, for example. This adjustment aspect may be combinable with other embodiments.

Figure 4:
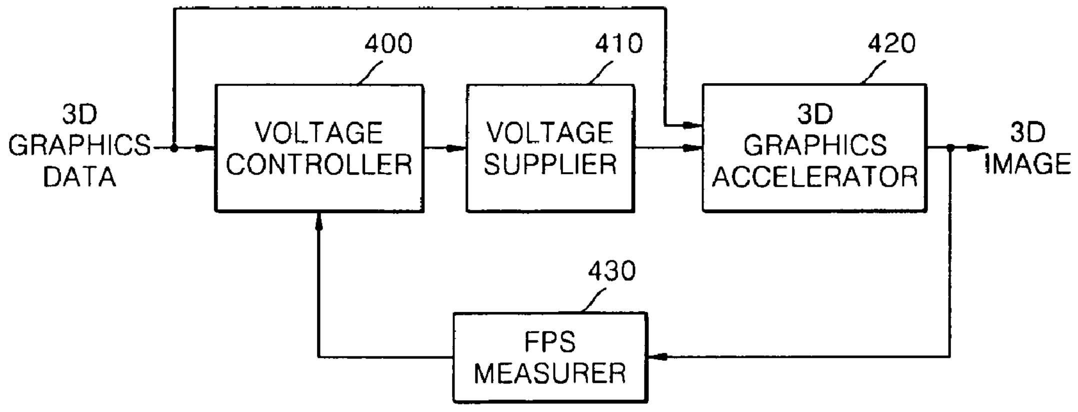
FIG. 4 illustrates a voltage control apparatus, according to another embodiment of the present invention.

FIG. 4 illustrates an apparatus controlling a voltage, according to an embodiment of the present invention, including a voltage controller 400, a voltage supplier 410, and an FPS measurer 430, for example.

The FPS measure 430 may measure the FPS of an image generated from the 3D graphics accelerator 120. The voltage controller 400, thus, may determine whether the measured FPS exceeds a predetermined threshold, for example. If the measured FPS exceeds the predetermined threshold, the voltage controller 400 may further reduce the voltage and frequency to be implemented with a 3D graphics accelerator 420. As an example, Table 6 below further illustrates a method of measuring by the voltage controller for adjusting the voltage and frequency according to the measured FPS.

TABLE 6

| V, F | Measured FPS | V', F' |
|---|---|---|
| V1, F1 | 15 FPS or less | V2, F2 |
| | 15 FPS~45 FPS | V1, F1 |
| | 45 FPS or more | V1, F1 |
| V2, F2 | 15 FPS or less | V3, F3 |
| | 15 FPS~45 FPS | V2, F2 |
| | 45 FPS or more | V1, F1 |
| V3, F3 | 15 FPS or less | V3, F3 |
| | 15 FPS~45 FPS | V3, F3 |
| | 45 FPS or more | V2, F2 |

Here, in Table 6, the V and F column represents respectively the voltage amplitude and frequency to be implemented with the 3D graphics accelerator 420, and the V' and F' column represents respectively the voltage and frequency adjusted by the voltage controller 400 according to the measured FPS. Referring to Table 6, when the FPS of a currently-generated image is between 15 FPS and 45 FPS, the voltage controller 400 may maintain the current voltage and frequency. When the FPS of the currently-generated image is equal to or smaller than 15 FPS, the voltage controller 400 may increase the voltage and frequency. When the FPS of the currently-generated image is equal to or larger than 45 FPS, the voltage controller 400 may reduce the voltage and frequency, for example.

Thus, the voltage controller 400 may control the voltage and frequency using both the actually-measured FPS and the control method described with reference to FIG. 3.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs). The media may also be a distributed network, so that the computer readable code is stored/transferred and executed in a distributed fashion.

As describe above, according to an embodiment of the present invention, a voltage and frequency to be implemented with a 3D graphics accelerator may be adjusted by the DVS technique so that the FPS of the generated image may not exceed a predetermined threshold. Accordingly, it is possible to control the power consumption of the 3D graphics accelerator while maintaining the performance of the 3D graphics accelerator at or above a given level. In particular, it is possible to very efficiently process a small amount of 3D graphics data at a low power in a portable device, for example.

Although a few embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for controlling a graphics accelerator, the apparatus comprising:

a voltage controller to determine a voltage and a frequency to be implemented with a graphics accelerator so that a frames per second (FPS) of an image to be generated by the graphics accelerator does not exceed a predetermined threshold; and a voltage supplier to supply the determined voltage and frequency to the graphics accelerator wherein the voltage controller comprises:

a characteristic value extractor to extract a characteristic value describing the image from graphics data to be provided to the graphics accelerator;

a memory to store a relationship between the characteristic value and the voltage and the frequency supplied to the graphics accelerator, the relationship being predetermined based on experimentation or measurement of characteristic values relative to FPS to limit the FPS of the generated image from exceeding the predetermined threshold; and a voltage/frequency detector to determine the voltage and the frequency corresponding to the extracted characteristic value based on the stored relationship.

2. The apparatus of claim 1, wherein the voltage controller determines the voltage and the frequency using a dynamic voltage scaling (DVS) technique.

3. The apparatus of claim 1, wherein the voltage controller reduces the voltage and/or the frequency when the FPS of the image exceeds the predetermined threshold.

4. The apparatus of claim 1, wherein the memory stores a plurality of pairs of voltages and frequencies for supply to the graphics accelerator such that each of the plurality of pairs is matched in the memory with corresponding characteristic values.

5. The apparatus of claim 4, wherein when the extracted characteristic value exceeds a corresponding characteristic value stored in the memory, the voltage controller controls the voltage and frequency to change to corresponding maximum values of voltages and frequencies stored in the memory.

6. The apparatus of claim 1, wherein the memory stores a relational expression between the characteristic value and the voltage and the frequency supplied to the graphics accelerator.

7. The apparatus of claim 1, wherein the characteristic value includes at least one of a number of vertexes, a sum of texture sizes, a number of lights, a texture filtering scheme, a number of commands to be used for one vertex in a vertex shader, and a number of commands to be used for one pixel in a pixel shader.

8. The apparatus of claim 7, wherein the voltage controller extracts at least one of the number of vertexes and the number of lights from the graphics data to determine a voltage and frequency supplied to a transform and lightning (TnL) unit included in the graphics accelerator, and extracts at least one of the number of vertexes, the sum of texture sizes, and the texture filtering scheme to determine a voltage and frequency supplied to a rasterizer included in the graphics accelerator.

9. The apparatus of claim 7, wherein the voltage controller extracts at least one of the number of vertexes and the number of commands to be used for one vertex in a vertex shader from the graphics data to determine a voltage and frequency supplied to the vertex shader included in the graphics accelerator, extracts at least one of the number of vertexes, the sum of texture sizes, and the number of commands to be used for the one pixel in the pixel shader to determine a voltage and frequency supplied to the pixel shader included in the graphics accelerator, and extracts at least one of the number of vertexes, the sum of texture sizes, and the texture filtering scheme to determine a voltage and frequency supplied to a rasterizer included in the graphics accelerator.

10. The apparatus of claim 1, further comprising an FPS measurer to measure an FPS of the image information, as generated by the graphics accelerator, wherein the voltage/frequency detector reduces the voltage and/or the frequency when the measured FPS exceeds the predetermined threshold.

11. The apparatus of claim 1, further comprising:

an FPS measurer to measure an FPS of the image, as generated by the graphics accelerator, wherein the voltage controller determines a predetermined voltage and a predetermined frequency, among voltages and frequencies that can be supplied to the graphics accelerator, to be the voltage and the frequency based on the measured FPS.

12. The apparatus of claim 1, further comprising the graphics accelerator, and wherein the graphics accelerator is a 3D graphics accelerator.

13. The apparatus of claim 12, wherein the voltage controller determines the voltage and the frequency using a DVS technique.

14. The apparatus of claim 12, wherein the memory stores a plurality of pairs of voltages and frequencies for supply to the graphics accelerator such that each of the plurality of pairs is matched in the memory with corresponding characteristic values.

15. The apparatus of claim 12, wherein the characteristic value includes at least one of a number of vertexes, a sum of texture sizes, a number of lights, a texture filtering scheme, a number of commands to be used for one vertex in a vertex shader, and a number of commands to be used for one pixel in a pixel shader.

16. The apparatus of claim 15, wherein the graphics accelerator comprises a TnL unit and a rasterizer, and the voltage controller:

extracts at least one of the number of vertexes and the number of lights from the graphics data to determine a voltage and frequency supplied to the TnL unit; and extracts at least one of the number of vertexes, the sum of texture sizes, and the texture filtering scheme to determine a voltage and frequency supplied to the rasterizer.

17. The apparatus of claim 15, wherein the graphics accelerator comprises the vertex shader, the pixel shader, and a rasterizer, and the voltage controller:

extracts at least one of the number of vertexes and the number of commands to be used for the one vertex in the vertex shader from the graphics data to determine a voltage and frequency supplied to the vertex shader;

extracts at least one of the number of vertexes, the sum of texture sizes, and the number of commands to be used for the one pixel in the pixel shader to determine a voltage and frequency supplied to the pixel shader; and extracts at least one of the number of vertexes, the sum of texture sizes, and the texture filtering scheme to determine a voltage and frequency supplied to the rasterizer.

18. A method of controlling a graphics accelerator, the method comprising:

determining a voltage and a frequency to be supplied to the graphics accelerator by using graphics data to be supplied to the graphics accelerator, so that a frames per second (FPS) of an image to be generated by the graphics accelerator does not exceed a predetermined threshold; and supplying the determined voltage and frequency to the graphics accelerator wherein the determining of the voltage and the frequency comprises:

extracting a characteristic value describing the image from the graphics data to be provided to the graphics accelerator;

reading a voltage and frequency corresponding to the extracted characteristic value from a memory storing relationships between characteristic values and voltages and frequencies to be supplied to the graphics accelerator, the relationships being predetermined based on experimentation or measurement of characteristic values relative to FPS to limit the FPS of the generated image from exceeding the predetermined threshold; and determining the read voltage and the read frequency to be the determined voltage and the frequency supplied to the graphics accelerator.

19. The method of claim 18, further comprising supplying the graphics data to the graphics accelerator, with the graphics accelerator being a 3D graphics accelerator and the graphics data being 3D graphics data.

20. At least one computer readable storage medium comprising computer readable code to implement the method of claim 19.

21. The method of claim 18, wherein the voltage and the frequency are determined using a DVS technique.

22. The method of claim 18, wherein the voltage and/or the frequency are reduced during the determination thereof when the FPS of the image exceeds the predetermined threshold.

23. The method of claim 18, wherein the characteristic value includes at least one of a number of vertexes, a sum of texture sizes, a number of lights, a texture filtering scheme, a number of commands to be used for one vertex in a vertex shader, and a number of commands to be used for one pixel in a pixel shader.

24. The method of claim 23, wherein the determining of the voltage and the frequency comprises:

extracting at least one of the number of vertexes and the number of lights from the graphics data to determine a voltage and frequency supplied to a TnL unit included in the graphics accelerator; and extracting at least one of the number of vertexes, the sum of texture sizes, and the texture filtering scheme to determine a voltage and frequency supplied to a rasterizer included in the graphics accelerator.

25. The method of claim 23, wherein the determining of the voltage and the frequency comprises:

extracting at least one of the number of vertexes and the number of commands to be used for the one vertex in the vertex shader from the graphics data to determine a voltage and frequency supplied to the vertex shader included in the graphics accelerator;

extracting at least one of the number of vertexes, the sum of texture sizes, and the number of commands to be used for the one pixel in the pixel shader to determine a voltage and frequency supplied to the pixel shader included in the graphics accelerator; and extracting at least one of the number of vertexes, the sum of texture sizes, and the texture filtering scheme to determine a voltage and frequency supplied to a rasterizer included in the graphics accelerator.

26. The method of claim 18, wherein in the determining of the voltage and the frequency, a predetermined voltage and a predetermined frequency, among predetermined voltages and frequencies that can be supplied to the graphics accelerator, are determined to be the voltage and the frequency.

27. The method of claim 18, further comprising:

measuring an FPS of the image, as generated by the graphics accelerator; and reducing the voltage and/or the frequency when the measured FPS exceeds the predetermined threshold.

28. At least one computer readable storage medium comprising computer readable code to implement the method of claim 18.

* * * * *